United States Patent Office 3,157,485
Patented Nov. 17, 1964

3,157,485
WEED KILLING COMPOSITION AND METHOD
Jeremiah F. Twomey, 433 Lyndale Drive,
St. Boniface, Manitoba, Canada
No Drawing. Filed July 17, 1961, Ser. No. 124,340
Claims priority, application Canada July 29, 1960
6 Claims. (Cl. 71—2.4)

This invention relates to an improved weed-killing composition.

Plant hormones such as 2,4-dichlorophenoxy acetic acid (hereinafter referred to as 2,4-D) have the effect of altering the enzymatic action within plants to which the hormone has been applied. Although a small amount of 2,4-D acts to stimulate enzymatic action, an excess of 2,4-D gives rise to deficiencies under the conditions of artificially stimulated growth created by the plant hormone with the consequence that there is a weed-killing effect.

This invention is based on the idea of improving the weed-killing effect resulting from the use of a plant hormone by leaf feeding plants not only with a herbicidal quantity of a plant harmone but also with an overdose of one or two minor elements. This throws the chemistry of the plant out of balance and increases other deficiencies.

I have found that manganese and arsenic individually, but preferably in combination are particularly effective in increasing the weed-killing effect of herbicidal quantities of plant hormones.

The plant hormone is preferably of the class which can broadly be defined as consisting of substituted phenoxy acids, their methyl and ethyl esters, acids and salts characterized by the presence of one or more members of the group chlorine, bromine and iodine, methyl amino and nitro groups substituted for hydrogen in the benzene ring. The substituted phenoxy groups are further characterized by a side chain connection to the oxygen on the benzene ring of an acid of the paraffin series, such as formic, acetic and propionic acid, as well as their methyl and ethyl esters, amides and salts. The most effective plant hormones are the halogen substituted phenoxy monocarboxylic aliphatic acids. The salts, esters and amides of such substances are approximately equivalent in efficiency and the choice will depend largely on factors of volatility, solubility, ease of application and commercial availability. Of the halogen substituted phenoxy monocarboxylic aliphatic acids, the compounds including chlorine substituted in the para position such as 2,4-dichlorophenoxy acetic acid and 2,4,5-trichlorophenoxy acetic acid give particularly effective results. Another plant hormone which can be used is indole acetic acid. Alpha dichloropropionic acid also may be used.

The minor element is preferably manganese and/or arsenic, but other minor elements may be used to achieve some of the advantages of this invention. The minor elements should be in the form of a compound which is assimilatable by leaf feeding, such as manganese sulphate or sodium arsenate.

The minor elements should be used in massive amounts which will vary according to the minor element and the conditions, but which will normally range in percentage weight from about one to twenty times the acid equivalent value of the composition.

It may be desirable to make a second application of the weed-killing composition a few weeks after the first application.

Example I

A test was made of the ability of dusts to kill vine maple. One year old stock was transplanted into pots in a greenhouse and was dusted at the rate of 12 pounds per acre. In comparative tests, the application of a dust containing 5% acid equivalent of 2,4-D, 5% acid equivalent of 2,4,5-T, (2,4,5-trichlorophenoxy acetic acid), and attaclay as a carrier gave 30% kill, whereas a dust containing 5% acid equivalent of 2,4-D and 5% acid equivalent of 2,4,5-T, 50% manganese sulphate and 1½% sodium arsenate gave an 80% kill and damage to the remainder. The damaged plants subsequently died.

Example II

An equal mixture of copper sulphate and a 10% acid equivalent dust having 5% acid equivalent of 2,4,5-T and 5% acid equivalent 2,4-D gave much more rapid kill of Canada thistle at 6 to 8 lbs. per acre, as compared with the same formulation without the copper sulphate.

The embodiments of the invention in which an exclusive property or privilege is claimed are defined as follows:

1. A weed-killing composition comprising a herbicidal amount of a plant hormone, an assimilatable manganese compound and an assimilatable arsenic compound adapted to provide an unbalanced mixture to increase the deficiencies in weeds to which said plant hormone has been applied in herbicidal amounts.

2. A composition as in claim 1 in which the plant hormone is selected from the group consisting of 2,4-dichlorophenoxy acetic acid, 2,4,5-trichlorophenoxy acetic acid, alpha dichloropropionic acid, indole acetic acid and mixtures thereof.

3. A composition as in claim 1 in which the assmilatable manganese compound is manganese sulphate.

4. A composition as in claim 1 in which the assimilatable arsenic compound is sodium arsenate.

5. A composition as in claim 1 in which said manganese and arsenic compounds are present in an amount of one to twenty times the acid equivalent value of the composition.

6. A method of killing weeds comprising the application to weeds of a herbicidal amount of a plant hormone, an assimilatable manganese compound and an assimilatable arsenic compound adapted to provide an unbalanced mixture to decrease the deficiencies in said weeds.

References Cited in the file of this patent
UNITED STATES PATENTS

| | | |
|---|---|---|
| 2,318,733 | Avery | May 11, 1943 |
| 2,642,354 | Barrons | June 16, 1953 |
| 2,768,889 | Twomey | Oct. 30, 1956 |